(12) United States Patent
Ko

(10) Patent No.: US 8,456,759 B2
(45) Date of Patent: Jun. 4, 2013

(54) LENS SYSTEM WITH REDUCED LENGTH, WIDE VIEW ANGLE, AND HIGH RESOLUTION

(75) Inventor: Chun-Cheng Ko, New Taipei (TW)

(73) Assignee: Wcube Co., Ltd., George Town (KY)

( * ) Notice: Subject to any disclaimer, the term of this patent is extended or adjusted under 35 U.S.C. 154(b) by 0 days.

(21) Appl. No.: 13/426,622

(22) Filed: Mar. 22, 2012

(65) Prior Publication Data
US 2013/0094098 A1    Apr. 18, 2013

(51) Int. Cl.
*G02B 3/02* (2006.01)
*G02B 9/60* (2006.01)

(52) U.S. Cl.
USPC ............ 359/714; 359/740; 359/763; 359/770

(58) Field of Classification Search
USPC .................................. 359/714, 740, 763, 770
See application file for complete search history.

(56) References Cited

U.S. PATENT DOCUMENTS

2010/0253829 A1* 10/2010 Shinohara ...................... 359/764
2011/0164327 A1*  7/2011 Sato .............................. 359/714

* cited by examiner

*Primary Examiner* — Evelyn A. Lester
(74) *Attorney, Agent, or Firm* — Altis Law Group, Inc.

(57) ABSTRACT

A lens system includes a first to fifth lenses. The second and fifth lenses have negative refractive power and the others have positive refractive power. The lens system satisfies: $D/TTL>1.05$; $Z/Y>0$; $G3R1/F3>G1R1/F1>0$; $G1R2/F1<G3R2/F3<0$; and $G5R1/F5<G5R2/F5<0$, where D is the diameter of the optical images of the lens system, TTL is the total length of the lens system, Z is the distance between the outer periphery of an image-side surface of the fourth lens to the center of the fourth lens, Y is the distance between the outer periphery of the fourth lens to the center of the fourth lens, G1R1, G2R2, G3R1, G3R2, G5R1 G5R2 are the radii of curvature of the object-side and image-side surfaces of the first, third, fifth lenses, respectively, and F1, F3, F5 are focal lengths of the first, third, fifth lenses, respectively.

6 Claims, 17 Drawing Sheets

LENS SYSTEM WITH REDUCED LENGTH, WIDE VIEW ANGLE, AND HIGH RESOLUTION

BACKGROUND

1. Technical Field

The present disclosure relates to lenses and, particularly, to a lens system which has a short total overall length, a wide field of view, and a high resolution over a large object distance range.

2. Description of Related Art

To obtain small camera modules which have a wide field of view and provide a high quality image over a large object distance range, a lens system having a short total overall length, a wide field of view, and a high resolution over a large object distance range is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described in detail with reference to the drawings.

Figure 1:
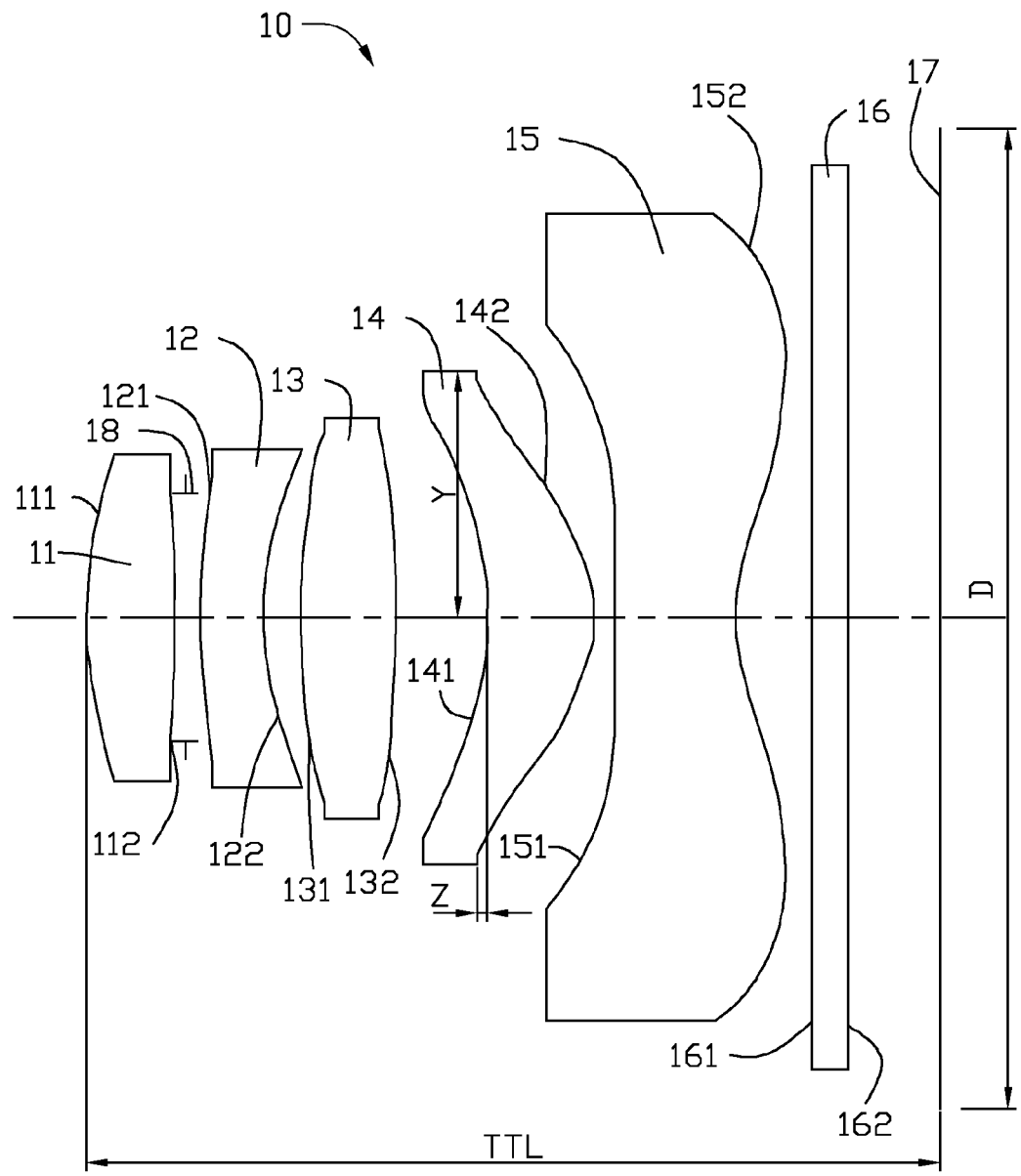
FIG. 1 is a schematic view of a lens system, according to an embodiment.

Referring to FIG. 1, a lens system 10, according to an embodiment, includes, in this order from the object side to the image side of the lens system 10, a first lens 11 of positive refractive power, an aperture stop 18, a second lens 12 of negative refractive power, a third lens 13 of positive refractive power, a fourth lens 14 of positive refractive power, and a fifth lens 15 of negative refractive power.

The first to fifth lenses 11-15 can be made from plastic, polymer, or glass, and, in this embodiment, are made of plastic to reduce cost.

The first to fifth lenses 11-15 are all aspheric lenses and each has two aspheric surfaces. The aspherical surface is shaped according to the formula:

$$x = \frac{ch^2}{1+\sqrt{1-(k+1)c^2h^2}} + \sum A_i h^i,$$

where h is the height from the optical axis of the lens system 10 to a point on the aspherical surface, c is the vertex curvature, k is a conic constant, and Ai is the i-th order correction coefficient of the aspherical surface.

When capturing images, light rays enter the lens system 10, pass through the first to fifth lenses 11-15 in sequence, and then pass through a filter 16, and finally form optical images on an image plane 17.

The first lens 11 has an object-side surface 111 (i.e., adjacent to the object side of the lens system 10) with a radius of curvature G1R1 and an image-side surface 112 (i.e., adjacent to the image side of the lens system 10) with a radius of curvature G1R2. The second lens 12 has an object-side surface 121 with a radius of curvature G2R1 and an image-side surface 122 with a radius of curvature G2R2. The third lens 13 has an object-side surface 131 with a radius of curvature G3R1 and an image-side surface 132 with a radius of curvature G3R2. The fourth lens 14 has an object-side surface 141 with a radius of curvature G4R1 and an image-side surface 142 with a radius of curvature G4R2. The fifth lens 15 has an object-side surface 151 with a radius of curvature G5R1 and an image-side surface 152 with a radius of curvature G5R2. The filter 16 has a surface 161 facing the object side of the lens system 10 and a surface 162 facing the image side of the lens system 10.

The lens system 10 satisfies the following condition formulas:

$$D/TTL > 1.05; \tag{1}$$

$$Z/Y > 0; \tag{2}$$

$$G3R1/F3 > G1R1/F1 > 0; \tag{3}$$

$$G1R2/F1 < G3R2/F3 < 0; \tag{4}$$

and $$G5R1/F5 < G5R2/F5 < 0. \tag{5}$$

Wherein D is the diameter of the optical images, TTL is the total length of the lens system 10 (the distance between a surface of the lens system 10 that is most adjacent to the object side of the lens system 10, i.e., the object-side surface 111, to the image plane 17), Z is the distance between the outer periphery of the image-side surface 142 to the center of the object-side surface 141 along a direction parallel to the optical axis of the lens system 10, Y is the distance between the outer periphery of the fourth lens 14 to the center of the fourth lens 14 along another direction perpendicular to the optical axis of the lens system 10, and F1, F3, and F5 are focal lengths of the first, third, and fifth lenses 11, 13, and 15, respectively.

By satisfying the above condition formulas (1)-(5), a short total overall length, a wide field of view, and a high resolution over a large object distance range can be obtained in the lens system 10. In contrast, if the above condition formulas (1)-(5) are not satisfied, the advantages of a high zoom ratio, a short total overall length, or/and the high resolution of the lens system 10 cannot be achieved.

To further enhance the resolution of the lens system 10, the lens system 10 further satisfies the following condition formulas:

$G1R1/F1>0.53;$  (6)

$G1R2/F1<-2.27;$  (7)

$G3R1/F3>0.62;$  (8)

$G3R2/F3<-1.56;$  (9)

$G5R1/F5<-10.04;$  (10)

and $G5R2/F5<-0.40.$  (11)

To efficiently correct lateral aberration occurring in the lens system 10, the lens system further satisfies the condition formula:

$Vd1=Vd3=Vd4=Vd5>53;$  (12)

and $Vd2<33.$  (13)

Wherein Vd1-Vd5 are the Abbe numbers of light at the wavelength of 587.6 nm (d light) in the first to fifth lenses 11-15, respectively.

The lens system 10 satisfies Tables 1-3 in a first embodiment, where the following symbols are used:
R: the curvature radius of each surface;
D: the distance between each two adjacent surfaces along the optical axis of the lens system 10;
Nd: the refractive index of d light in each lens or the filter 17; and
Vd: the Abbe number of d light in each lens or the filter 17.

TABLE 1

| Surface | R(mm) | D(mm) | Nd | Vd |
|---|---|---|---|---|
| Object Surface | infinity | — | — | — |
| 111 | 2.67 | 0.51 | 1.53 | 56.0 |
| 112 | −9.35 | −0.02 | — | — |
| 18 | infinity | 0.18 | — | — |
| 121 | 3.95 | 0.36 | 1.63 | 23.4 |
| 122 | 1.57 | 0.22 | — | — |
| 131 | 3.43 | 0.56 | 1.53 | 56.0 |
| 132 | −9.57 | 0.53 | — | — |
| 141 | −1.97 | 0.62 | 1.53 | 56.0 |
| 142 | −0.88 | 0.12 | — | — |
| 151 | 21.08 | 0.71 | 1.53 | 56.0 |
| 152 | 1.05 | 0.44 | — | — |
| 161 | infinity | 0.21 | 1.52 | 58.6 |
| 162 | infinity | 0.54 | — | — |
| 17 | infinity | — | — | — |

TABLE 2

| Surface | A4 | A6 | A8 | A10 | A12 | K |
|---|---|---|---|---|---|---|
| 111 | 0.0716 | −0.0834 | 0.0815 | −0.0395 | 0.0014 | −11.58 |
| 112 | −0.0348 | 0.1631 | −0.2407 | 0.1562 | −0.0387 | — |
| 121 | −0.1556 | 0.2829 | −0.2628 | 0.0402 | 0.0392 | 3.56 |
| 122 | −0.1170 | 0.2794 | −0.2771 | 0.1170 | −0.0211 | −4.26 |
| 131 | −0.0783 | 0.0339 | −0.0015 | 0.0285 | −0.0174 | — |
| 132 | −0.0189 | 0.0053 | −0.0422 | 0.0256 | 0.0031 | — |
| 141 | 0.0343 | −0.0022 | 0.0021 | −0.0095 | 0.0051 | −0.26 |
| 142 | −0.0577 | 0.0098 | 0.0127 | −0.0017 | −0.0000065 | −2.72 |
| 151 | −0.0804 | −0.00018 | 0.0117 | −0.0051 | 0.00073 | — |
| 152 | −0.0624 | 0.0190 | −0.0048 | 0.00063 | −0.000036 | −6.38 |

TABLE 3

| D | TTL | Z | Y | F1 | F3 | F5 |
|---|---|---|---|---|---|---|
| 5.71 mm | 4.98 mm | 0.07 mm | 1.44 mm | 3.97 mm | 4.82 mm | −2.10 mm |

Figure 2:
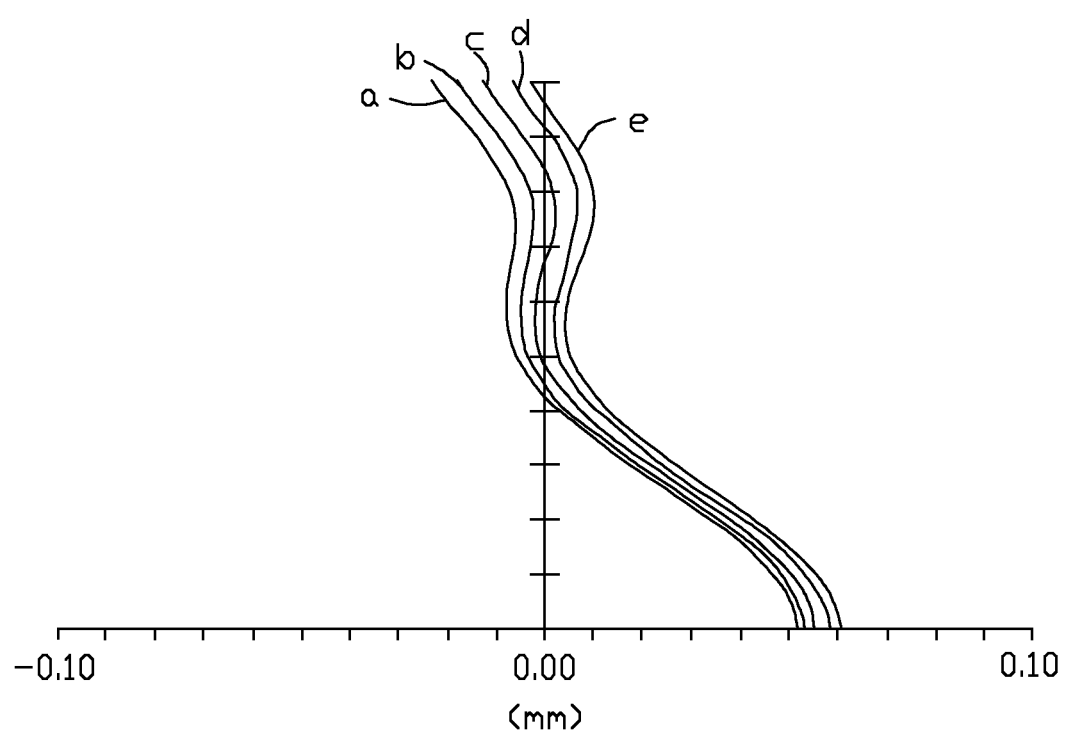
FIGS. 2, 4, 6, 8 are graphs showing the spherical aberration, field curvature, distortion, and modulation transfer function (MTF) characteristics curves of the lens system of FIG. 1 in a telephoto state, respectively, according to a first embodiment.
Figure 3:
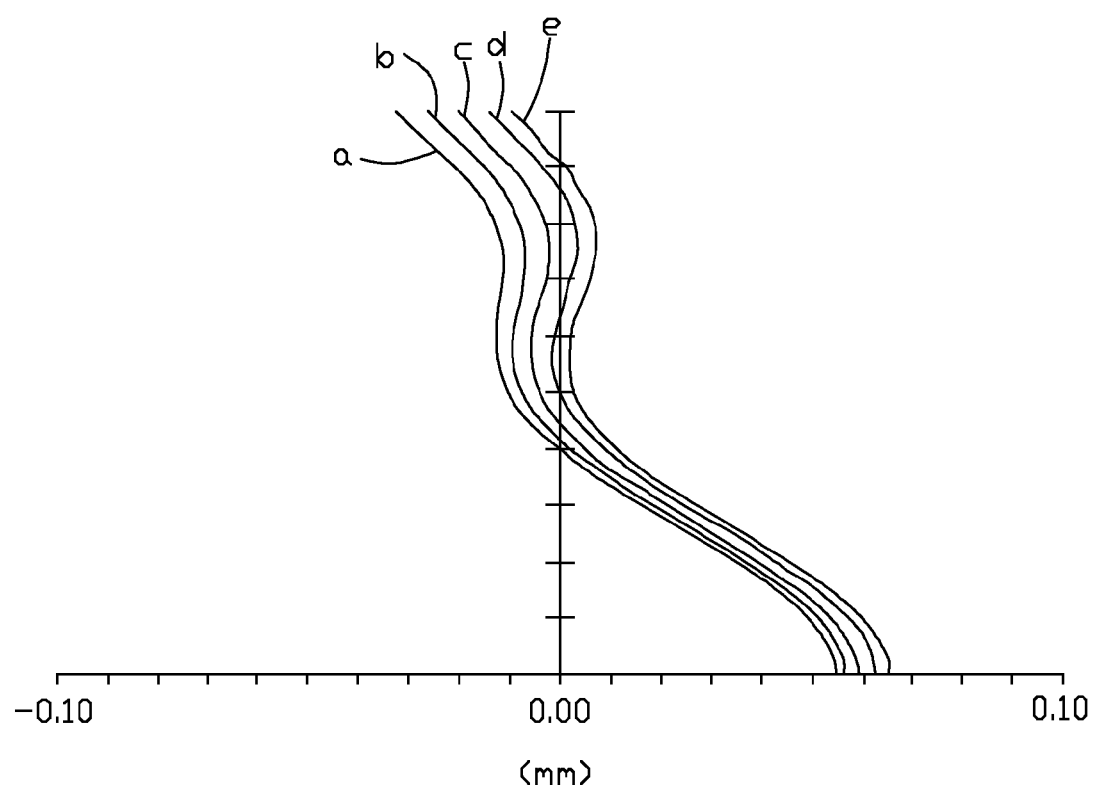
FIGS. 3, 5, 7, 9 are graphs showing the spherical aberration, field curvature, distortion, and MTF characteristics curves of the lens system of FIG. 1 in a wide angle state (the object distance is about 100 mm), respectively, according to the first embodiment.
Figure 4:
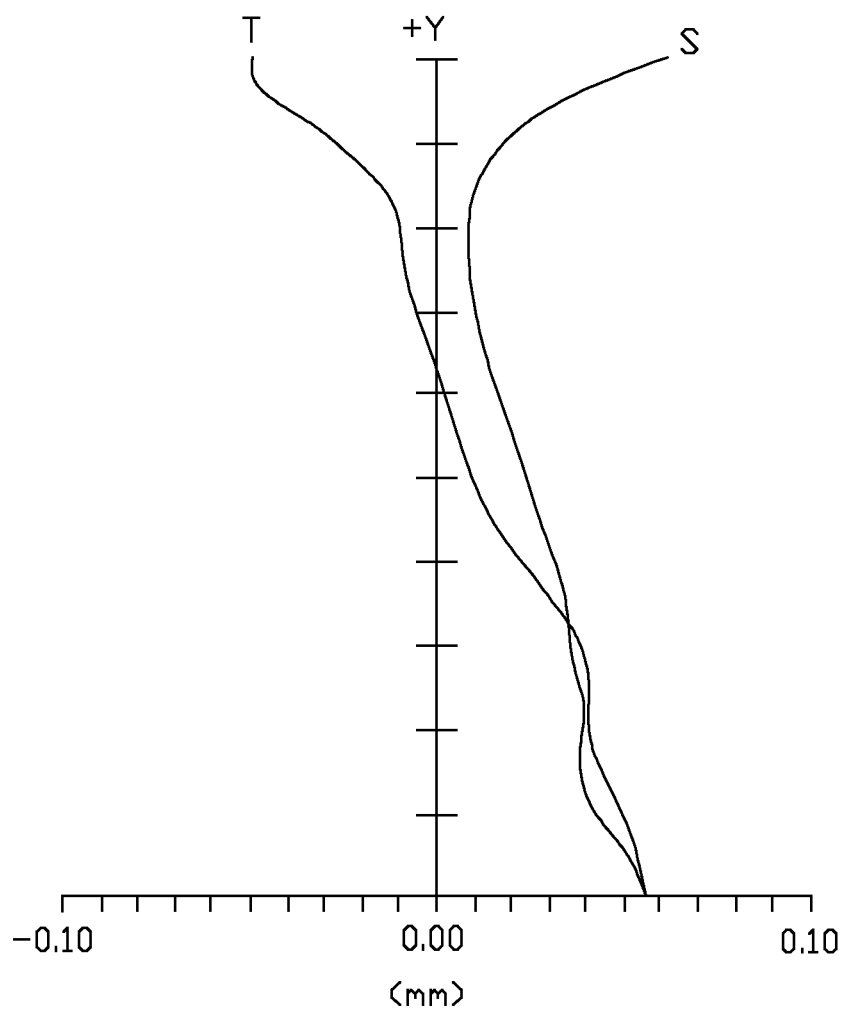
Figure 5:
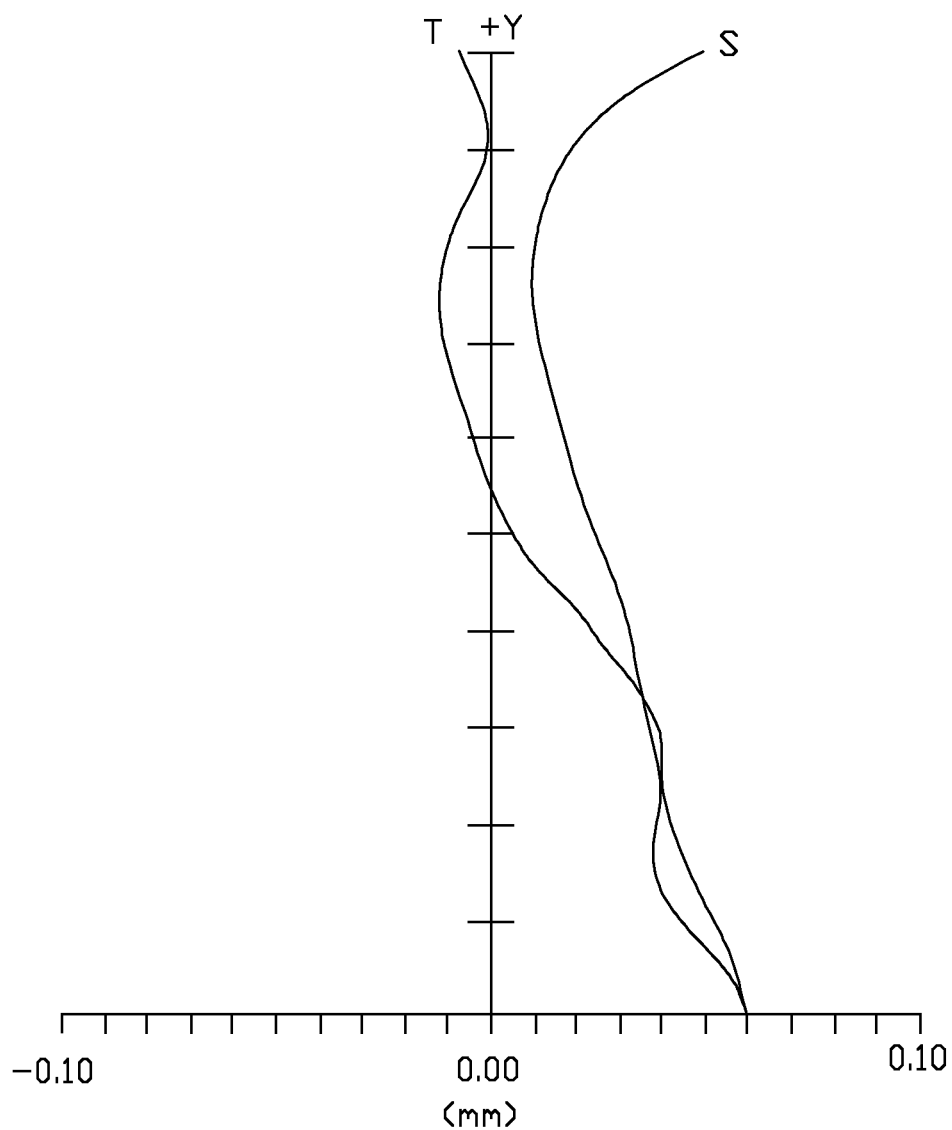
Figure 6:
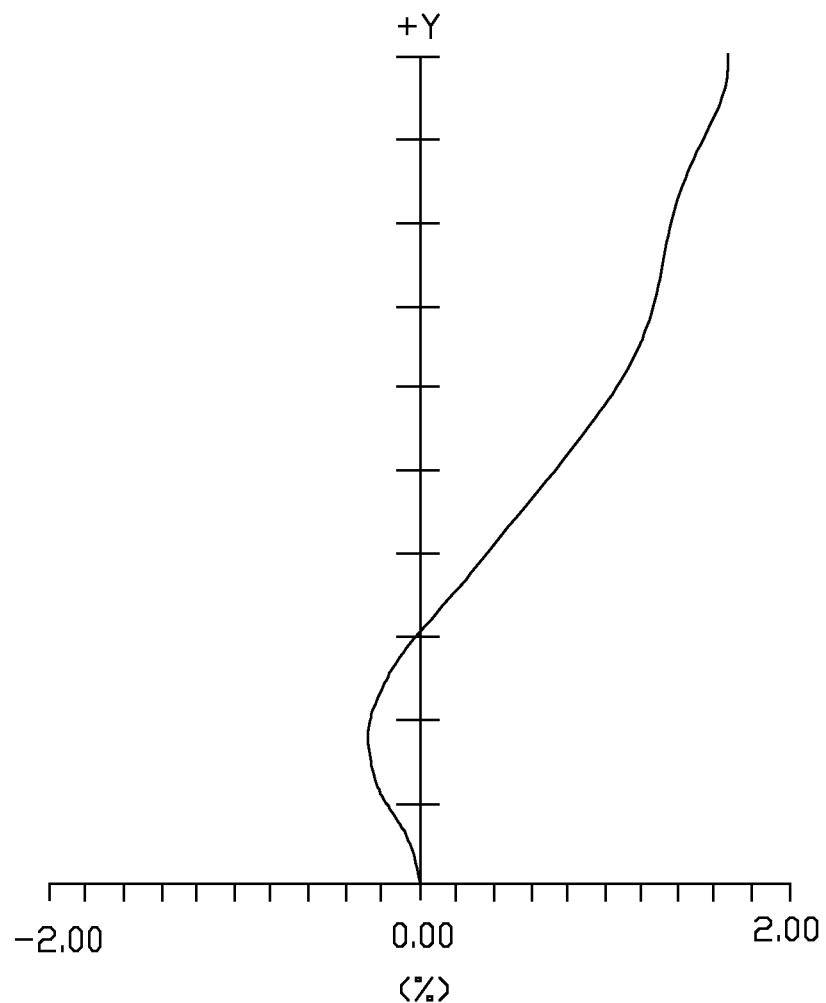
Figure 7:
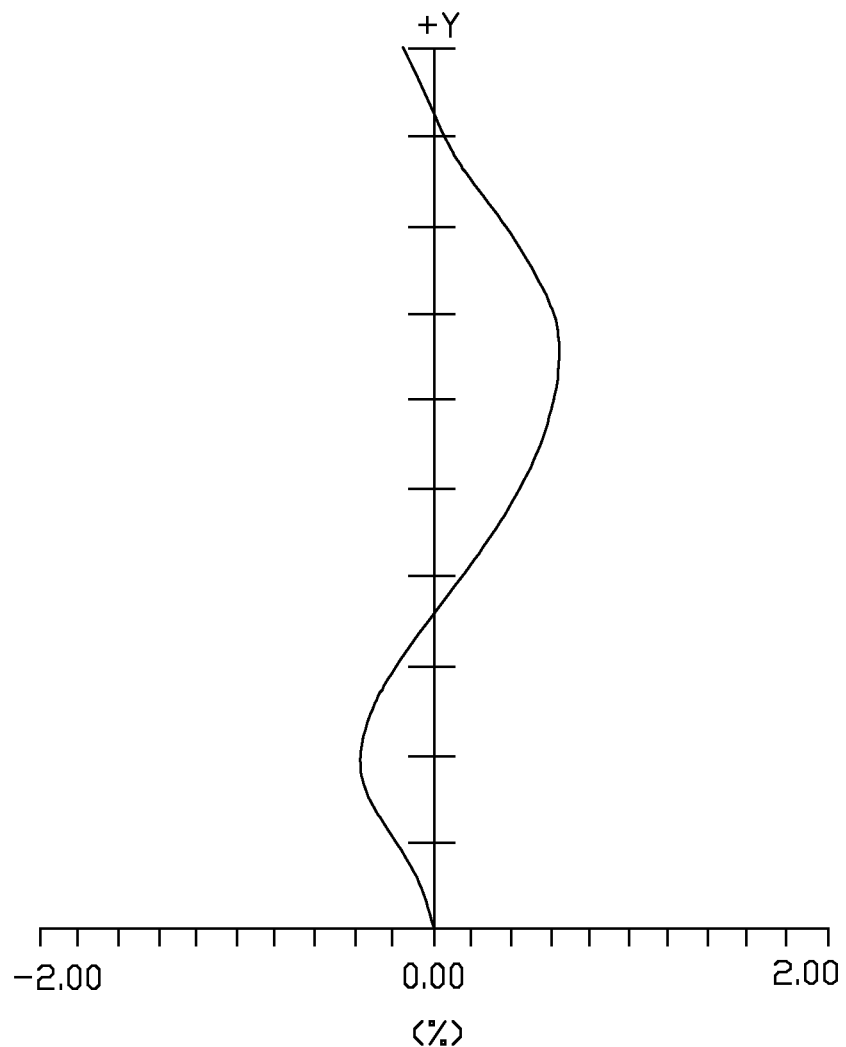
Figure 8:
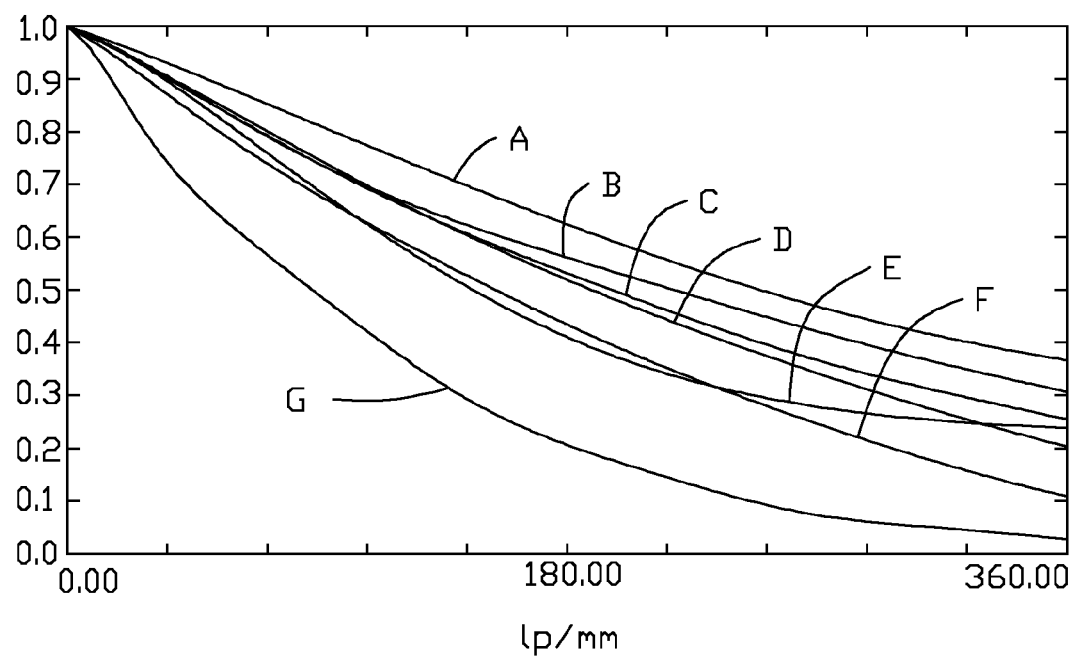
Figure 9:
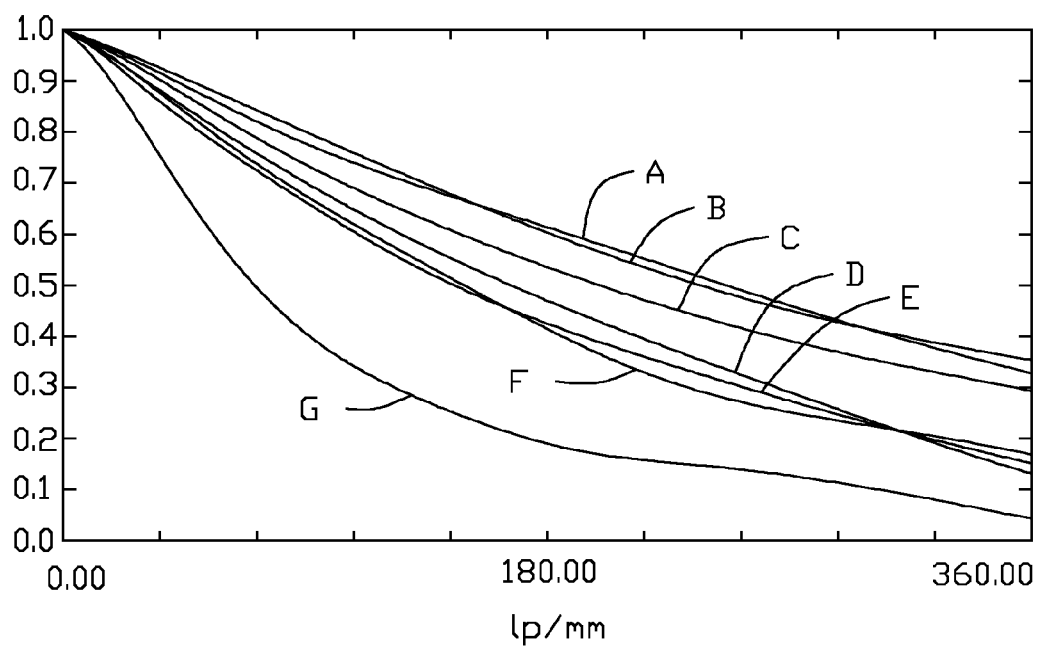

In FIGS. 2-3, the curves a-e show the spherical aberration characteristics of light at wavelengths of 470 nm, 510 nm, 555 nm, 610 nm, 650 nm in the lens system 10, which are controlled to be in a range of about −0.1 mm to about 0.1 mm. In FIGS. 4-5, the curves t, s show the meridional and sagittal field curvatures in the lens system 10, which are controlled to be in a range of about −0.1 mm to about 0.1 mm. In FIGS. 6-7, the curves depict the distortion characteristics of light in the lens system 10, which is controlled to be in a range of about −2% to about 2%. In FIGS. 8-9, the curves show the MTF characteristics of ½ field (A curve, MTF>60%), 0.6 field (B, D curves, 40%<MTF<60%), 0.8 field (E, F curves MTF>40%), and 1 field (C, G curves, 40%<MTF<60%), wherein the spatial frequency is about ½ Nyquist Frequency (180 lp/mm).

The lens system 10 satisfies Tables 4-6 in a second embodiment.

TABLE 4

| Surface | R(mm) | D(mm) | Nd | Vd |
|---|---|---|---|---|
| Object Surface | infinity | — | — | — |
| 111 | 2.55 | 0.52 | 1.53 | 56.0 |
| 112 | −13.07 | 0.009 | — | — |
| 18 | infinity | 0.14 | — | — |
| 121 | 3.91 | 0.38 | 1.63 | 23.4 |
| 122 | 1.54 | 0.17 | — | — |
| 131 | 3.34 | 0.54 | 1.53 | 56.0 |
| 132 | −7.21 | 0.52 | — | — |
| 141 | −1.91 | 0.68 | 1.53 | 56.0 |
| 142 | −0.85 | 0.14 | — | — |
| 151 | 22.28 | 0.62 | 1.53 | 56.0 |
| 152 | 1.01 | 0.99 | — | — |
| 161 | infinity | 0.21 | 1.52 | 58.6 |
| 162 | infinity | 0.04 | — | — |
| 17 | infinity | — | — | — |

TABLE 5

| Surface | A4 | A6 | A8 | A10 | A12 | K |
|---|---|---|---|---|---|---|
| 111 | 0.0871 | −0.0938 | 0.0816 | −0.0336 | −0.0016 | −12.44 |
| 112 | −0.0580 | 0.1844 | −0.2250 | 0.1160 | −0.0241 | — |
| 121 | −0.1850 | 0.3673 | −0.3573 | 0.0711 | 0.0528 | −1.44 |
| 122 | −0.0912 | 0.2777 | −0.2985 | 0.1395 | −0.0292 | −5.92 |
| 131 | −0.1002 | 0.0692 | −0.0105 | 0.0321 | −0.0218 | — |
| 132 | −0.0306 | 0.0214 | −0.0365 | 0.0131 | 0.0122 | — |
| 141 | 0.0063 | 0.0049 | 0.0197 | −0.0230 | 0.0108 | 0.31 |
| 142 | −0.0916 | 0.0185 | 0.0128 | −0.0047 | 0.0015 | −2.87 |
| 151 | −0.0835 | −0.002 | 0.0162 | −0.0076 | 0.0011 | — |
| 152 | −0.0685 | 0.0215 | −0.0054 | 0.00069 | −0.00004 | −6.32 |

TABLE 6

| D | TTL | Z | Y | F1 | F3 | F5 |
|---|---|---|---|---|---|---|
| 5.71 mm | 4.97 mm | 0.06 mm | 1.41 mm | 4.06 mm | 4.37 mm | −2.01 mm |

Figure 10:
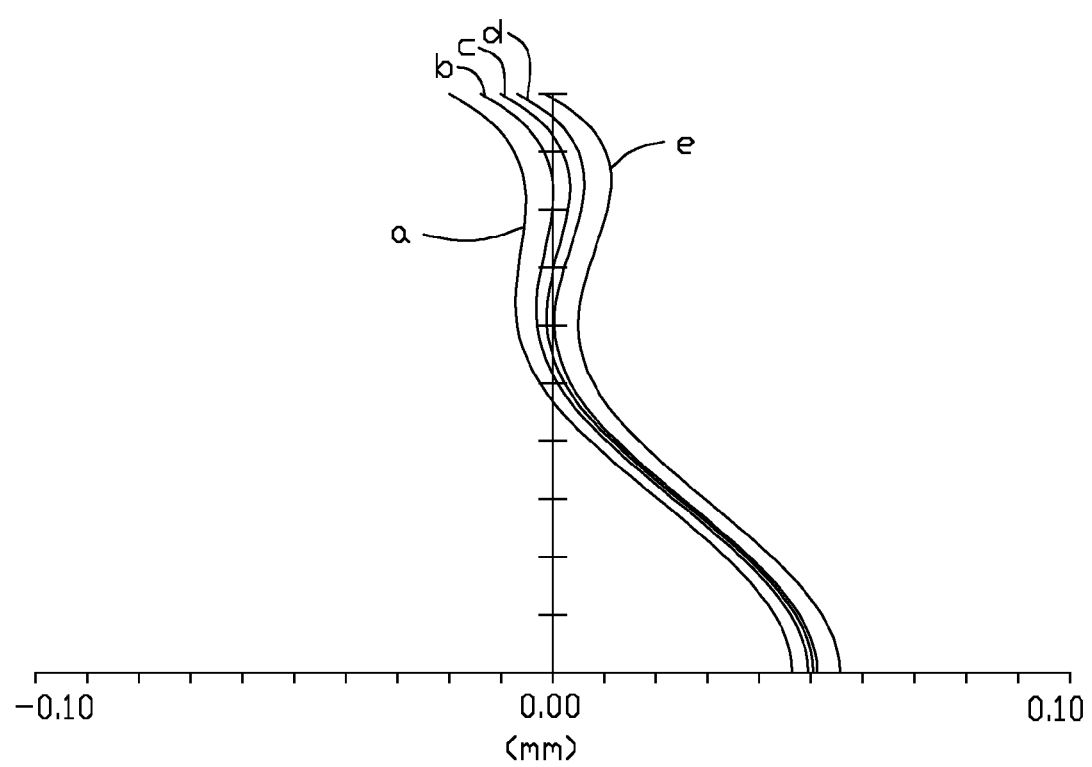
FIGS. 10, 12, 14, 16 are graphs showing the spherical aberration, field curvature, distortion, and MTF characteristics curves of a lens system according to a second embodiment in the telephoto state, respectively.
Figure 11:
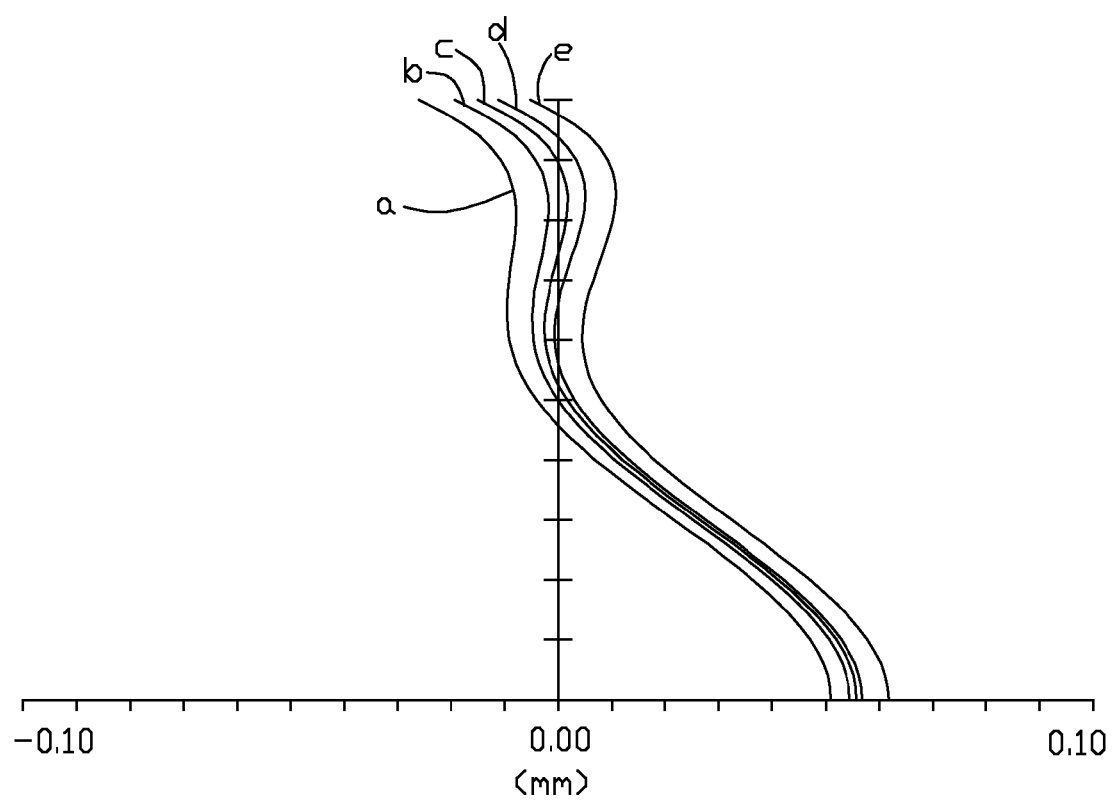
FIGS. 11, 13, 15, 17 are graphs showing the spherical aberration, field curvature, distortion, and MTF characteristics curves of the lens system in the wide angle state (the object distance is about 100 mm), respectively, according to the second embodiment.

In FIGS. 10-11, the curves a-e show the spherical aberration characteristics of light at wavelengths of 470 nm, 510 nm, 555 nm, 610 nm, 650 nm in the lens system 10, which are controlled to be in a range of about −0.1 mm to about 0.1 mm.

Figure 12:
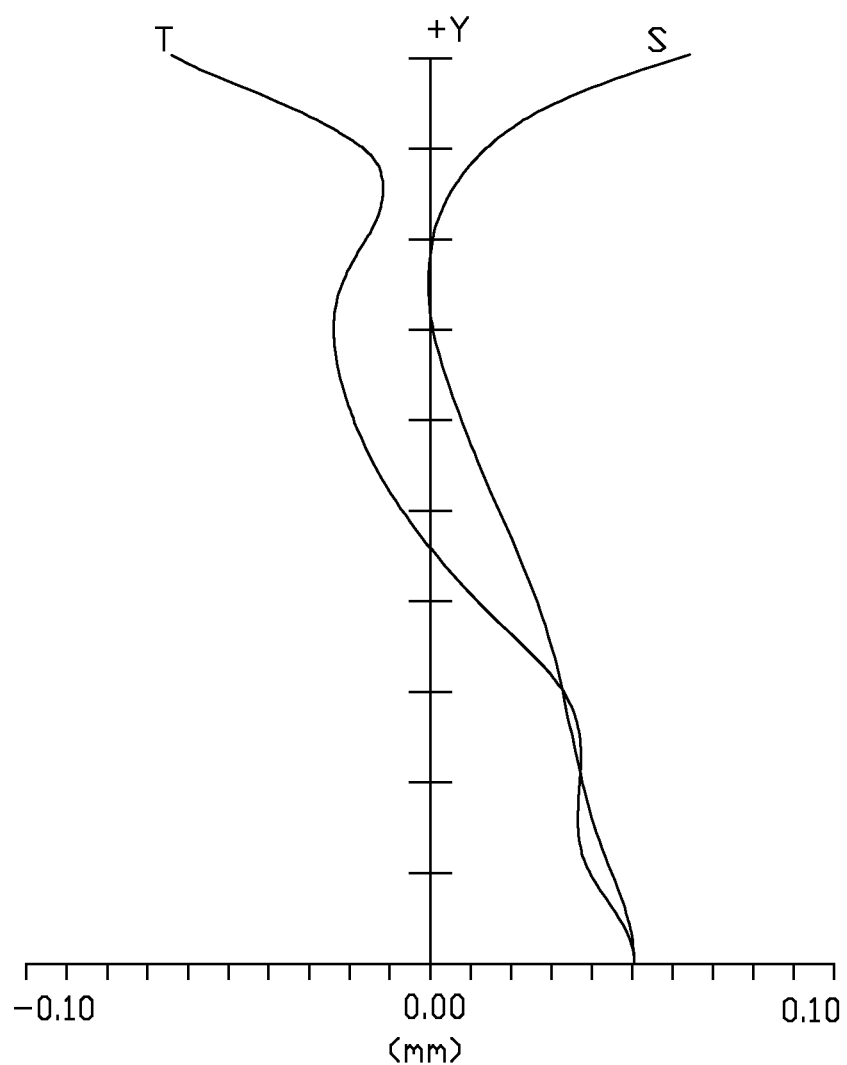
Figure 13:
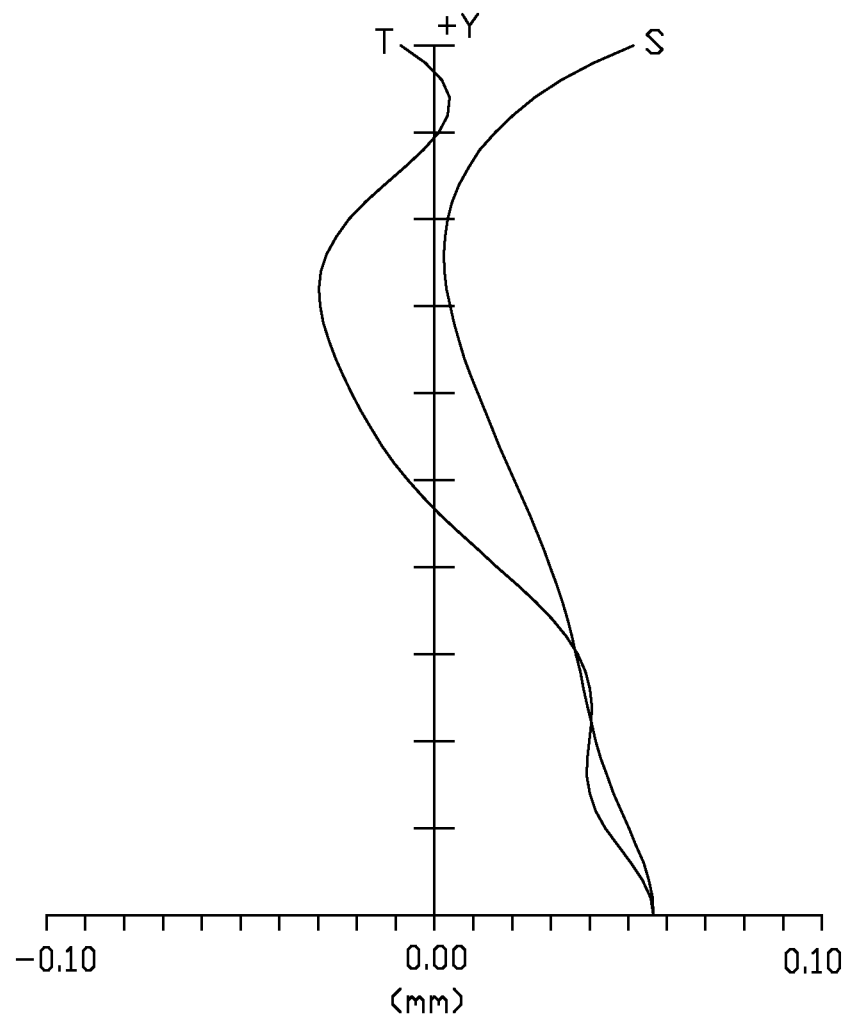
Figure 14:
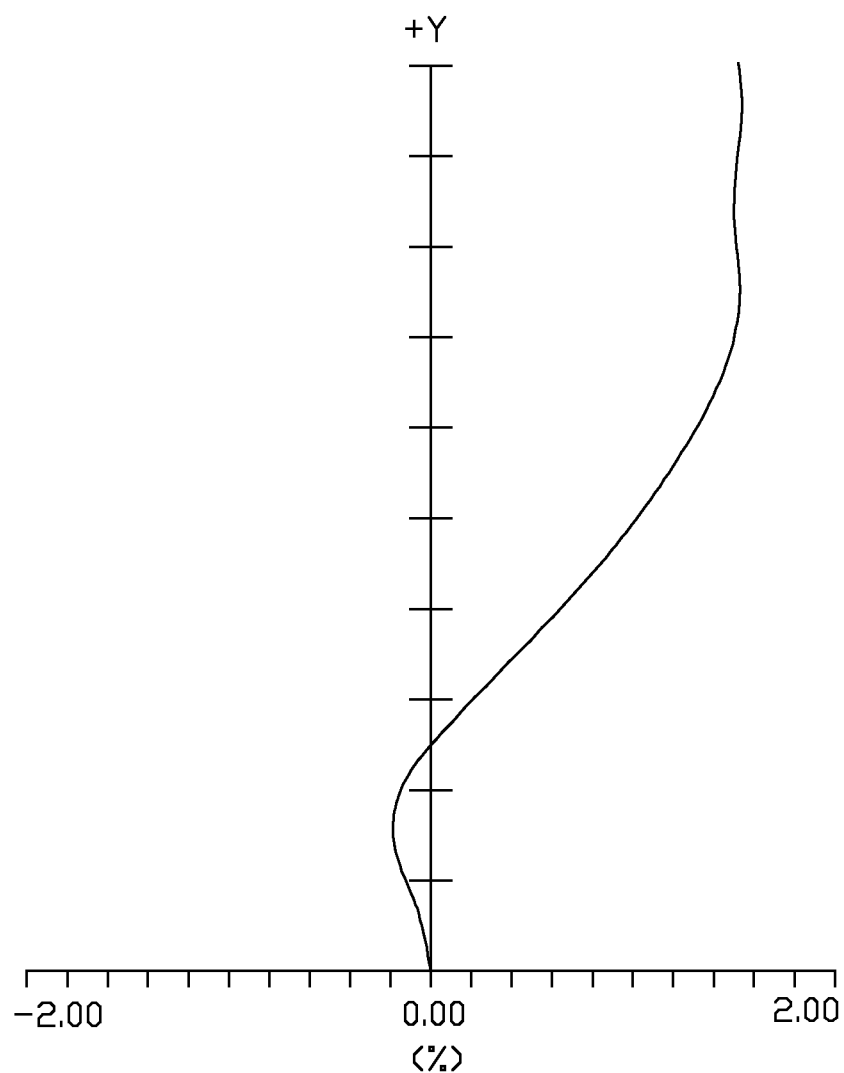
Figure 15:
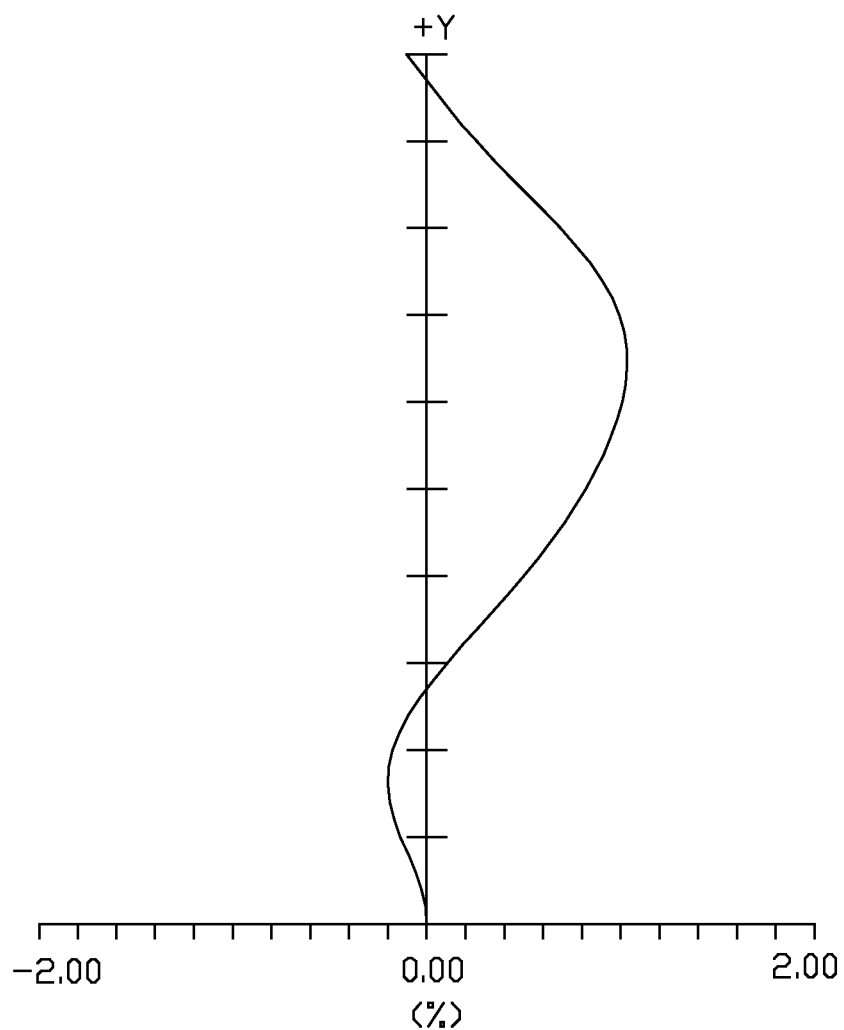
Figure 16:
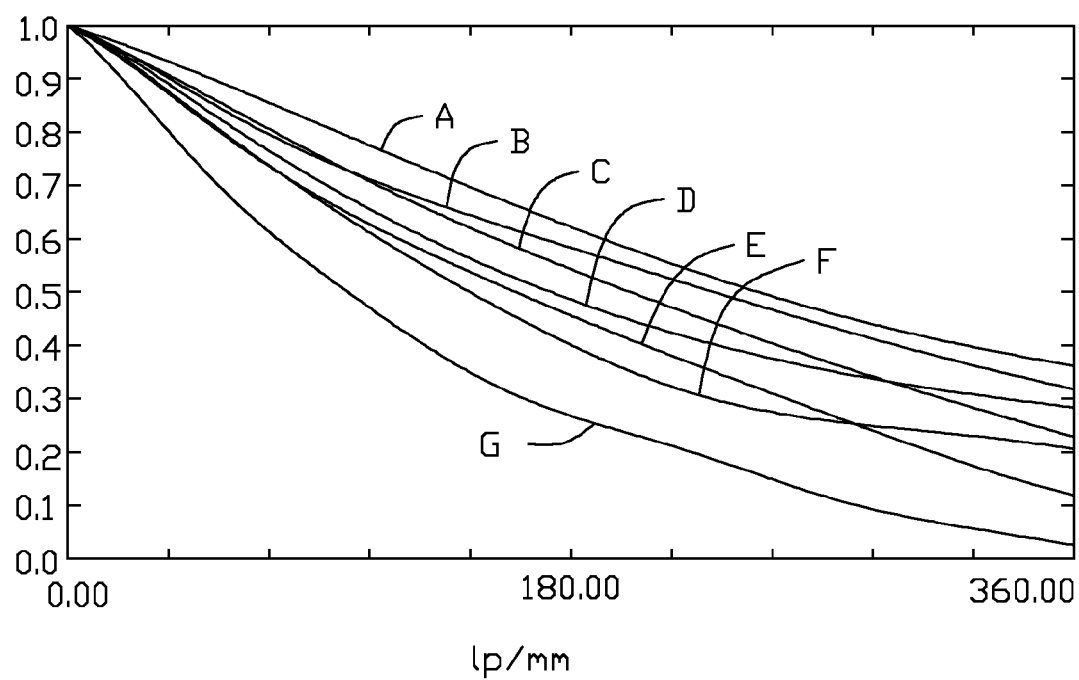
Figure 17:
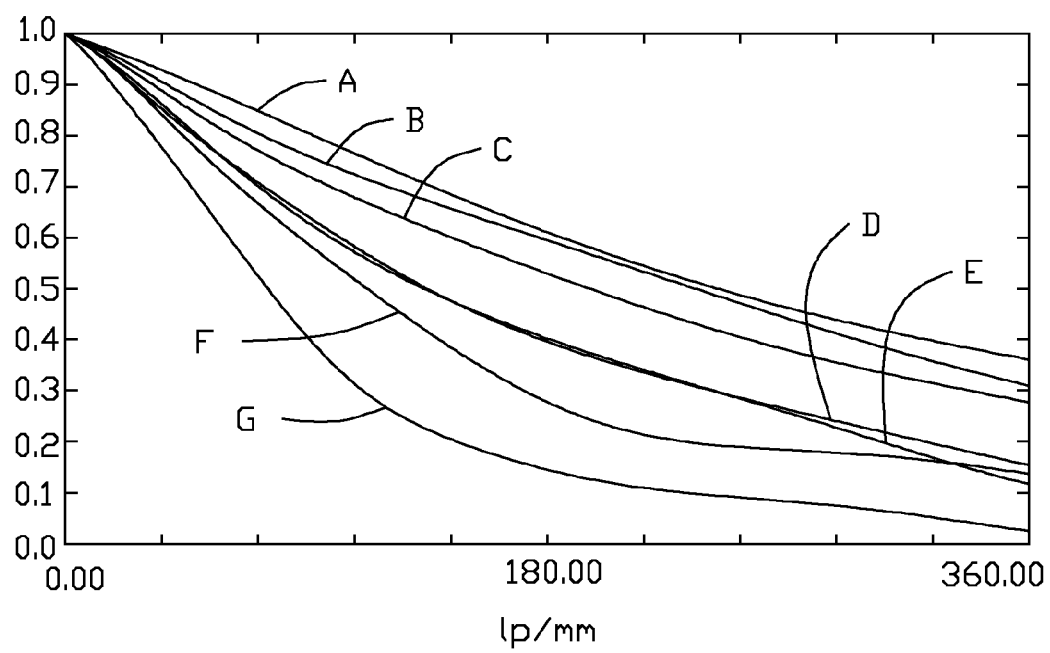

In FIGS. 12-13, the curves t, s show the meridional and sagittal field curvatures in the lens system 10, which are controlled to be in a range of about −0.1 mm to about 0.1 mm. In FIGS. 14-15, the curves depict the distortion characteristics of light in the lens system 10, which is controlled to be in a range of about −2% to about 2%. In FIGS. 16-17, the curves show the MTF characteristics of ½ field (A curve, MTF>60%), 0.6 field (B, D curves, 40%<MTF<60%), 0.8 field (E, F curves MTF>40%), and 1 field (C, G curves, 40%<MTF<60%), wherein the spatial frequency is about ½ Nyquist Frequency (180 lp/mm).

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A lens system for imaging an object on an image plane, the lens system comprising, in this order from the object side to the image side thereof:
    a first lens of positive refractive power;
    a second lens of negative refractive power;
    a third lens of positive refractive power;
    a fourth lens of positive refractive power, the fourth lens comprising an object-side surface facing the object side and an image-side surface facing the image side; and
    a fifth lens of negative refractive power;
    wherein the lens system satisfies the following condition formulas:

$$D/TTL > 1.05; \qquad (1)$$

$$Z/Y > 0; \qquad (2)$$

$$G3R1/F3 > G1R1/F1 > 0; \qquad (3)$$

$$G1R2/F1 < G3R2/F3 < 0; \qquad (4)$$

and $$G5R1/F5 < G5R2/F5 < 0, \qquad (5)$$

where D is the diameter of optical images formed by the lens system on the image plane, TTL is the total length of the lens system, Z is the distance between an outer periphery of the image-side surface to the center of the object-side surface along a direction parallel to an optical axis of the lens system, Y is the distance between the outer periphery of the image-side surface to the center of the object-side along another direction perpendicular to the optical axis of the lens system, G3R1, G1R1, G2R2, G3R2, G5R1 G5R2 are the radii of curvature of an object-side surface of the third lens, an object-side surface of the first lens, an image-side surface of the second lens, an image-side surface of the third lens, an object-side surface of the fifth lens, and an image-side surface of the fifth lens, respectively, and F1, F3, F5 are focal lengths of the first, third, and fifth lenses, respectively.

2. The lens system of claim 1, wherein the first to fifth lenses are made from a material selected from the group consisting of plastic, polymer, and glass.

3. The lens system of claim 1, wherein the first to fifth lenses are all aspheric lenses and each has two aspheric surfaces.

4. The lens system of claim 1, further comprising an aperture stop between the first lens and the second lens.

5. The lens system of claim 1, wherein the lens system satisfies the following condition formulas:

$$G1R1/F1 > 0.53; \qquad (6)$$

$$G1R2/F1 < -2.27; \qquad (7)$$

$$G3R1/F3 > 0.62; \qquad (8)$$

$$G3R2/F3 < -1.56; \qquad (9)$$

$$G5R1/F5 < -10.04; \qquad (10)$$

and $$G5R2/F5 < -0.40 \qquad (11).$$

6. The lens system of claim 1, wherein the lens system satisfies the following condition formulas:

$$Vd1 = Vd3 = Vd4 = Vd5 > 53; \qquad (12)$$

and $$Vd2 < 33; \qquad (13)$$

Wherein Vd1-Vd5 are the Abbe numbers of light at the wavelength of 587.6nm (d light) in the first to fifth lenses, respectively.

* * * * *